United States Patent [19]

Mari

[11] Patent Number: 4,982,381

[45] Date of Patent: Jan. 1, 1991

[54] METHOD AND DEVICE FOR ACQUIRING AND PROCESSING SIGNALS OBTAINED IN WELLS AND PARTICULARLY IN HORIZONTAL WELLS

[75] Inventor: Jean-Luc Mari, Chatou, France

[73] Assignee: Institut Francais du Petrole, Rueil Malmaison, France

[21] Appl. No.: 441,982

[22] Filed: Nov. 28, 1989

[30] Foreign Application Priority Data

Nov. 28, 1988 [FR] France .................. 88 15654

[51] Int. Cl.⁵ ..................... G01V 1/40; G01V 1/36
[52] U.S. Cl. ..................... 367/27; 367/48; 181/101
[58] Field of Search ............. 367/27, 48, 53, 58, 367/911; 181/101; 324/337, 363, 366

[56] References Cited

U.S. PATENT DOCUMENTS

| | | | |
|---|---|---|---|
| 3,408,622 | 10/1968 | Cox | 367/48 |
| 4,016,942 | 4/1977 | Wallis et al. | 181/101 |
| 4,460,986 | 7/1984 | Millouet et al. | 367/27 |
| 4,597,464 | 7/1986 | Chelminski | 181/114 |
| 4,641,520 | 2/1987 | Mao | 73/151 |
| 4,833,658 | 5/1989 | Staron | 367/27 |
| 4,873,675 | 10/1989 | Ban | 367/912 |

OTHER PUBLICATIONS

Lamar et al.; "Seismic Filtering . . . Antiaverage"; Paris, VI, Univ. Drac Thesis, 122 pages, 1982; abst. supplied.
Verm et al.; "Imaging VSP's"; 19th Annu. SPE OTC, 4/30/87, vol. 4, pp. 161–166; abst. supplied.

*Primary Examiner*—Nelson Moskowitz
*Attorney, Agent, or Firm*—Antonelli, Terry, Stout & Kraus

[57] ABSTRACT

A method is disclosed for acquiring and processing logs obtained by a well-logging tool moved in a well, providing better discrimination between the discontinuities of the sub-soil oriented substantially in the same direction as the well and situated on each side thereof, and particularly in a substantially horizontal well. The method includes the displacement of the tool along the well and the provision of at least two series of signal transmission, reception and logging cycles, the position of the signal transmission and/or reception means relatively to the axis of the well being different from one series to another, so as to cause the distance from the transmission and/or reception means to the discontinuities on each side of the well to vary. Combining the logs from these series of cycles makes it possible to distinguish the reflections on the side of the well from which they come.

16 Claims, 4 Drawing Sheets

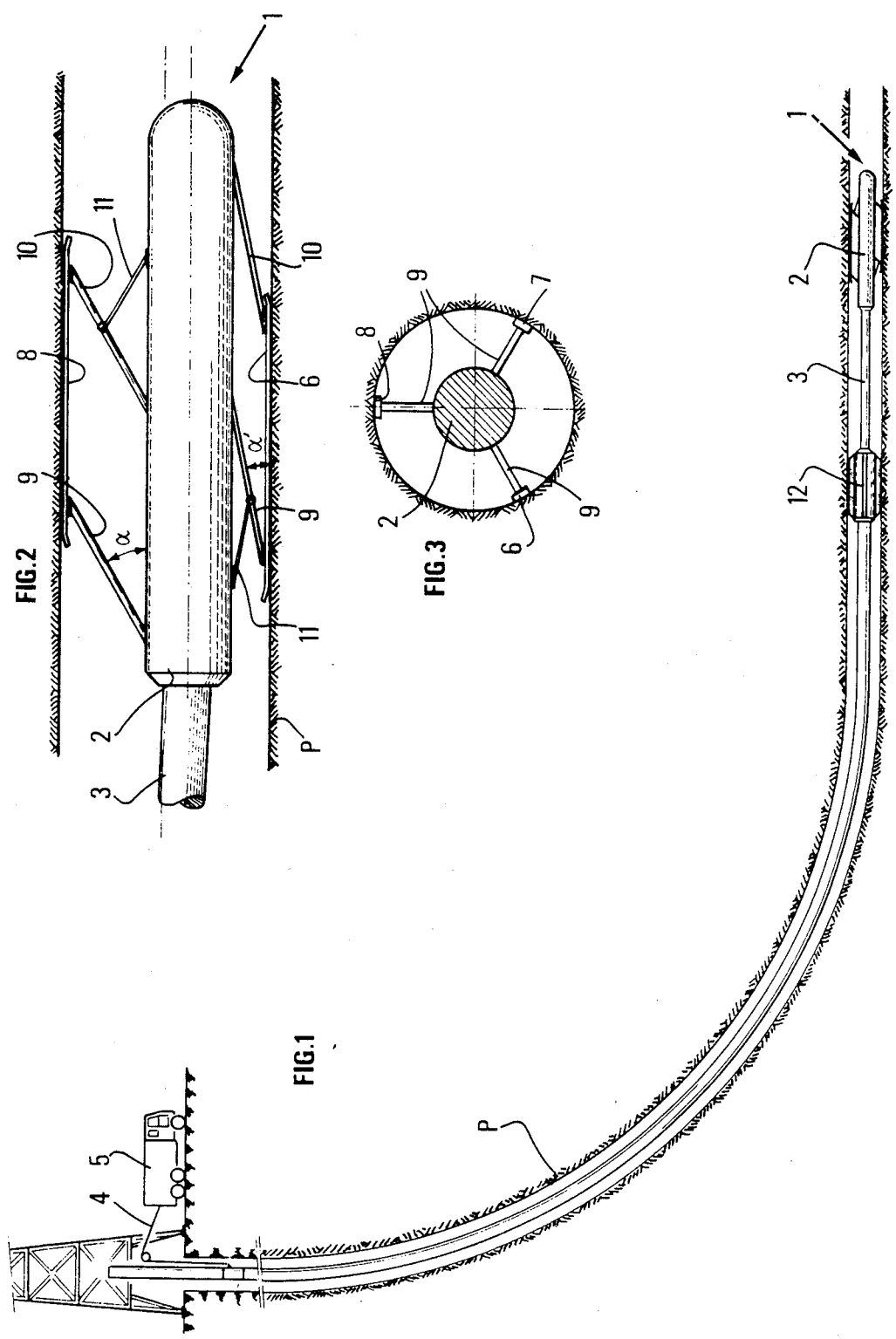

METHOD AND DEVICE FOR ACQUIRING AND PROCESSING SIGNALS OBTAINED IN WELLS AND PARTICULARLY IN HORIZONTAL WELLS

BACKGROUND OF THE INVENTION

1. Field of the Invention

The invention relates to a method and a device for acquiring and processing signals obtained in wells and particularly in substantially horizontal wells or drill-holes passing through a subterranean zone, giving a better discrimination between the discontinuities of the sub-soil. The invention applies particularly well for discriminating between geological discontinuities oriented substantially in the same direction as the well and situated on each side thereof, from logs obtained by means of a well-logging tool moved in the well.

2. Description of the Prior Art

The investigation of a zone of the sub-soil likely for example to contain hydrocarbons may be achieved by drilling a well through the zone and lowering therein-side a well-logging tool comprising one or more transmission units adapted for transmitting signals into the geological formations around the well and one or more reception units for receiving the signals reflected and refracted by the discontinuities of the sub-soil more or less close to the well. The signals received are generally transferred to a surface laboratory and recorded. The recordings are then processed so as to make them readable by an interpreter. The signals transmitted and received may, be of very different kinds. They may, for example, acoustic waves or electromagnetic waves, etc. The method of the invention will be described hereafter using acoustic waves but it goes without saying that this is only one particular case which does not restrict the generality of the method.

Drill-holes are often vertical or substantially, so but in the zones of the sub-soil which geologists consider the most likely to contain hydrocarbons, it is usual to drill holes which are very highly slanted with respect to the vertical, and even substantially horizontal, so as to pass through the subterranean layers at a small angle and obtain information about the superincumbent bed and the floor (or base) of a possible reservoir. Under these conditions, it is important to discriminate between the waves received from formations above and below the drill-hole. That is possible so long as the dip of the reflectors with respect to the direction of the well is not too small and is of the same sign towards the top and the floor of the zone passed through or reservoir. If such is the case, the apparent speeds of the acoustic signals received (events) on each side of the well are of opposite signs and can be distinguished using a conventional apparent speed filtering method, as is well known in geophysics.

A prospecting method applicable in wells which are slanted slightly with respect to the horizontal is described, for example, in the European patent application EP 246 148.

Discrimination in the well logs of signals coming respectively from the floor and from the top of a reservoir becomes very difficult when the relative dip of the reflectors with respect to the direction of the well is substantially zero, or reduced to a few degrees, because these signals have very closely related apparent speeds. This configuration, which is frequent in very deviated or horizontal wells, is also found in the vertical or slightly slanted portions of the drill-holes passing through a zone of faults having substantially the same orientation. It is also known that the periphery of a well, whatever its direction, is generally adversely affected by the mud which was used during drilling and has infiltrated into the formations. The propagation speed of the waves in this peripheral zone is for this reason different from that in the surrounding formations, and parasite reflections occur from the interfaces substantially parallel to the direction of the well. Here again, discrimination in the logs between the reflected waves coming respectively from the opposite sides of the well is made practically impossible.

SUMMARY OF THE INVENTION

The method of the invention makes possible good discrimination, particularly between the geological discontinuities (or markers) situated on each side of a well or drill-hole passing through a zone of the sub-soil and having substantially the same orientation as it. The method of the invention comprises the displacement of a well-logging tool along the well and the provision of transmission-reception cycles each comprising the transmission of waves into the formations of the sub-soil surrounding the well by transmission means, reception of the waves reflected by the discontinuities of the sub-soil by reception means, and recording or logging of the signals received so as to form cross sections representative of the formations around the well. The method characterized in that it comprises :

providing along a portion at least of the well at least two series of transmission-reception cycles corresponding to different transverse positions of the transmission means and/or reception means with respect to the axis of the well, so that the distances between said means and discontinuities situated on each side are different for each series of cycles effected, and combining together the recorded logs following said series of cycles along said well portion, so as to form cross-sections in which said discontinuities on each side of the well are separated from each other. At each position along the well occupied by the well-logging tool, at least two successive transmission-reception cycles may be carried out, the transverse position of the transmission means and/or reception means relative to the axis of the well being different for each cycle.

The series of transmission-reception cycles may also be carried out successively by displacing the transmission means and/or reception means transversely with respect to the axis of the well between two successive series.

In one embodiment, the longitudinal and transverse displacements are carried out by moving the well-logging tool relative to the well.

In another embodiment, the transmission means and/or reception means comprise at least two distinct units laterally offset with respect to each other, relative to the axis of the well, the units employed for carrying out two successive transmission-reception cycles at the same longitudinal position of the well being different.

In another embodiment, the different transverse positions of the transmission means and/or reception means are obtained by lateral displacement of said means relatively to the well-logging tool.

BRIEF DESCRIPTION OF THE DRAWINGS

Other features and advantages of the method and characteristics of well-logging tools adapted for implementing the method will be clear from the following description of embodiments, given by way of non limitative examples, with reference to the accompanying drawings, in which :

FIG. 1 shows schematically a device for acquiring and processing signals in a very deviated well;

FIG. 2 shows schematically one embodiment of a well-logging tool which may be off-centered.

FIG. 3 show schematically the arrangement of the shoes for anchoring the well -logging tool of FIG. 2;

DESCRIPTION OF THE PREFERRED EMBODIMENTS

Figure 4A:
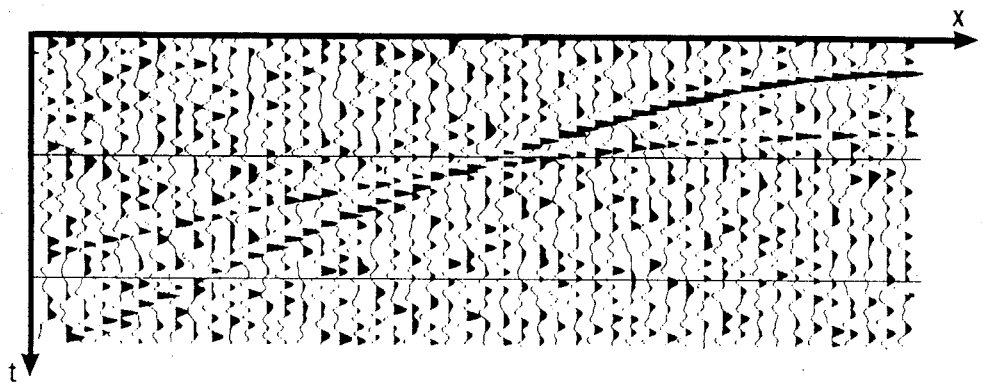
FIGS. 4A and 4B show two logging sections corresponding to the same portion of a well for two different values of eccentricity of the well-logging tool of FIG. 2.

The method of the invention may be implemented using a well-logging tool 1 for sonic type wells for example. The tool 1 comprises (FIGS. 1 to 3) a body 2 fixed at the end of a string of relatively flexible pipes 3. The tool is lowered from the surface all along the well P. When it reaches the well portions with very high slant with respect to the vertical, its progress is made possible by pushing the drill string 3. The body 2 of the well-logging tool contains at least one acoustic wave transmission transducer and at least one reception transducer for collecting the waves which have been propagated thereto after reflection or refraction from different discontinuities about the well-logging tool, whether it is a question of geological discontinuities or of the cemented casing which very often lines wells, especially in their portions which are slightly slanted with respect to the horizontal. These transducers are not shown in the drawings.

The well-logging tool 1 is connected t the surface installation by a multi-function cable 4 passing inside the drill string 3.

For connecting the multi-function cable to the well-logging tool, it is preferable to use the method described, for example, in patent FR 2 501 777 filed by the Applicant. According to this method, the cable ends in a female socket which descends along the drill string pushed by a pressurized fluid until it fits on a male connection disposed at the top of the body of the tool.

The cable comprises one or more lines for transferring the signals picked up by the reception transducer or each of them to a surface recording laboratory 5. The transferred signals are digitized and recorded.

The method of the invention is used with a well-logging tool such that the position of the transmission and-/or reception transducers can be modified with respect to the axis of the well, i.e. it is possible to vary their distances to the surrounding discontinuities having a small dip relatively to the extension direction of the well.

In a first embodiment, the position of the transducers is modified using an off centered logging tool. It comprises for example three anchorage shoes 6, 7, 8 (FIG. 3) spaced 120° apart about the body. Each of the shoes is fixed to two arms 9, 10 (FIG. 2) which may pivot between a retracted position along the body and an open position. A rod 11 connects one of the arms of each pair of arms 9, 10 to a drive means of a known type contained in the body and not shown. Preferably, a common drive means is used for actuation of the control rods 11 associated with two of the shoes 6, 7 so that their movements are identical and another for controlling the movement of the third shoe 8. To facilitate the displacement of tool 1 along the well portions with small dip, one or more centering devices of known type are generally used, inserted upstream on the flexible string 3.

When the well-logging tool operates in a portion of a horizontal well or of a well with a small dip, body 2 is oriented so that arms 9, 10 associated with the third shoe 8 are substantially in a vertical plane. Positioning may be controlled from the surface by a more or less pronounced rotation of the drill string. Detection of the correct position of the arms associated with the third shoe 8 may be provided by different known means. For example, a pendulum may be used suitably disposed in the body (and not shown) which closes a contact when the arms of the third shoe are in the desired vertical plane. By giving the same orientation to the well-logging tool at every position of the well portion studied, the transmission and reception transducers may thus be held in position in a relative arrangement which is always identical.

Off-centering the well-logging tool is obtained by controlling the drive means so as to reduce for example the opening angle $\alpha'$ of arms 9, 10 associated with shoes 6, 7 and at the same time increasing the corresponding angle $\alpha$ of the arms 9, 10 associated with the third shoe 8 (FIG. 2).

Implementation of the method of the invention requires at least two series of transmission-reception cycles displacing the well-logging tool along the well while varying for each cycle transverse position of the transducers with respect to the axis of the well.

With an off-centered well-logging tool, the method may be implemented in two ways.

1. The tool is pushed to an initial position at the bottom of the well portion to be studied. A given value is chosen for angles $\alpha$, and $\alpha'$ and a slow and continuous pull is exerted on the drill string. During displacement of the tool, a series of acoustic transmission-reception cycles is effected, and a first series of traces or first iso-offset section is logged. Then the tool is returned to its initial position and, after modifying the values of angles $\alpha$ and $\alpha'$, a second series of transmission-reception cycles is carried out so as to obtain a second series of traces or iso-offset section. The same operation may be repeated for other offset values so as to obtain more than two different iso-offset sections.

2. Discontinuous acquisition may also be used. The well-logging tool is brought successively to a series of separate positions along the well portion to be studied. At each position, the drive means are actuated to give the tool a certain eccentricity of a predetermined value, and a first transmission-reception cycle is carried out. With the tool remaining at the same position in the well, its eccentricity is modified by a predetermined amount and a second transmission-reception cycle is carried out. The operation is repeated if required while modifying the eccentricity each time.

The tool is then moved to the next position in the well, and the succession of transmission-reception cycles is repeated while adopting the same values of eccentricity as at the preceding position. Following a series of longitudinal displacements, it is also possible to form iso-offset sections by associating the traces obtained for the same value of eccentricity at all the positions successively occupied by the tool.

The preceding series being carried out, pre-processing (optional) is then preferablY carried out so as to eliminate from the iso-offset sections obtained all the signals which do not correspond to reflections from the discontinuities of the surrounding formations, such as the incoming signal refracted as P or S waves, the interface waves called pseudo-Rayleigh or Stoneley waves, or so-called casing waves, by applying methods well known to geophysicists, and particularly a matrix filtering method based on computing the spectral matrix of the logged signals. Such a method is describe, for example, in Lacombe, J.L., 1979 "Differentes approaches de l'analyse spectrale" in Annales des Telecom; no. 3-4.

Preprocessing is simplified if the geologists have previous knowledge of the zone of the ground passed through and may estimate the speed of wave propagation.

In this case, spacing between the transmission and reception transducers in the tool is chosen, for example, so that each interface wave train (and each S wave train when it exists) arrives at the receivers after the reflected compression waves, which makes possible a better discrimination thereof in the logs.

Figure 4B:
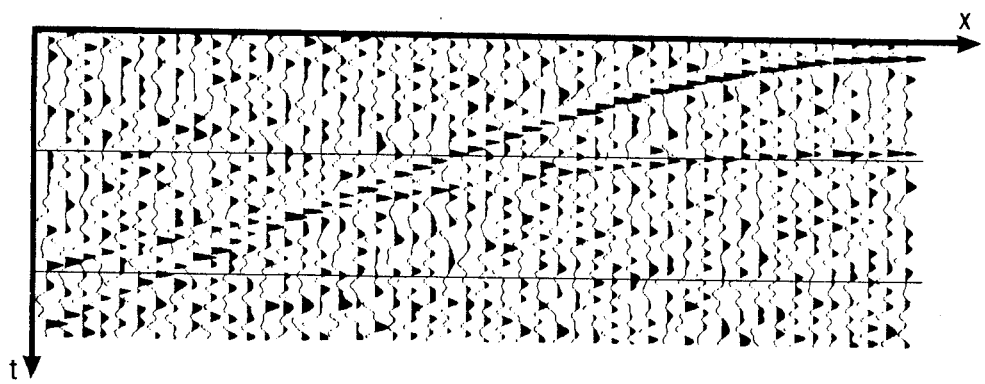

In FIGS. 4A and 4B, one made with a centered tool such as shown in FIG. 3, the other with an off-centered tool (FIG. 2), it can be seen that two reflection indicatrices which appear are offset in time respectively with respect to each other.

The variation of the value of the offset induces in the reflection indicatrices a static shift, which makes it possible, on the one hand, to differentiate those which are associated with reflectors situated above the horizontal well from those below the horizontal well by studying their relative positions in time from one section to the other, and, on the other hand, to separate these indicatrices.

The static shift depends on the value of the offset of the transducers and on the speed of propagation of the waves in the mud filling the well. For a speed in the mud of 1600 m/s and an offset value of 1 cm, the static shift is estimated at 6$\mu$s. The shift in time of the reflected incoming signals is twice the static shift.

In so-called total field acoustic well-logging, the time sampling pitch is conventionally 5$\mu$s or 2$\mu$s. It is then possible to check that a small offset induces in the reflections delays in time appreciably greater than the sampling pitch. With an acoustic well-logging tool of a diameter between 5 and 10 cm, in a drilled well of about 20 cm in diameter, several series of cycles may be carried out with different offset values, and so a plurality of iso-offset sections obtained.

The method then comprises a discrimination step for locating on which side of the well are situated the discontinuities detectable in the different iso-offset sections, by a combining the sections. To carry out this step, a technique is used which is known per se and which is called averaging, or anti-averaging, as will be seen hereafter.

A reference section is chosen, for example the one which corresponds to a zero offset. With respect to the reference section, each iso-offset section is offset in time by applying a positive (or negative, depending on the direction of the offset) static correction equal to the shift in time. The latter is calculated as a function of the value of the offset and of the speed of the waves in the fluid of the well so as to phase the reflections associated with the reflectors coming from below (or, depending on the case, from above) the well.

With the sections phased, two combination techniques, already mentioned, may be chosen.

The first consists in adding all the iso-offset sections after offsetting. If N is their number, the amplitude of the signals on the in-phase indicatrices is multiplied by N, the signal to noise ratio is improved by a factor $\sqrt{N}$. The phase shifted indicatrices conserve their initial amplitudes.

The second technique consists in subtracting from the reference section each of the iso-offset sections obtained. In this case, the phased indicatrices associated with reflectors situated above the well (or below depending on the case) are eliminated and the resultant section only shows reflections associated with reflectors situated below the well (or above, depending on the case). It should be noted that in each resultant section, each reflection indicatrix is formed of a doublet of reflections with opposite amplitudes separated by a time interval equal to the static shift. The reflection may be reshaped by applying an operator known to specialists under the name of Bacchus operator. After reshaping, the resultant sections may be phased and summed. In this case, the amplitude of the indicatrices is multiplied by $2(N-1)$, and the signal to noise ratio is multiplied by $\sqrt{N}$.

Figure 5A:
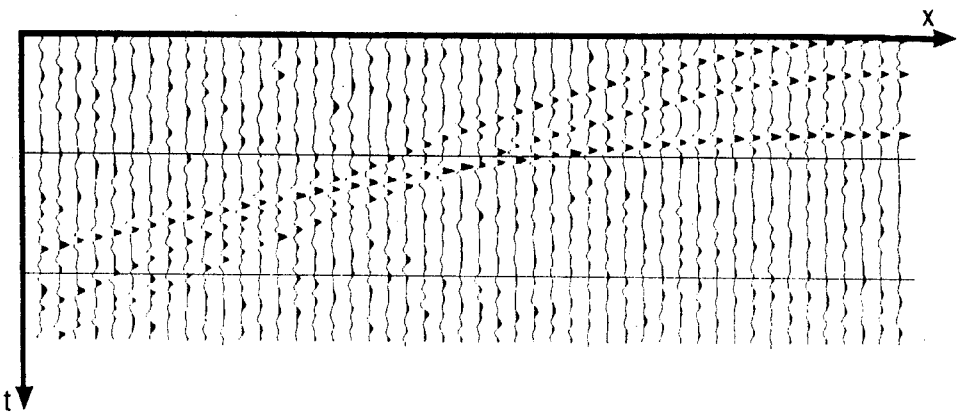
FIGS. 5A and 5B show the effect of combining the different logging sections obtained, after phasing, by a summing or averaging technique, which makes it possible to discriminate those discontinuities on one side of the well and on the other side; and those
Figure 5B:
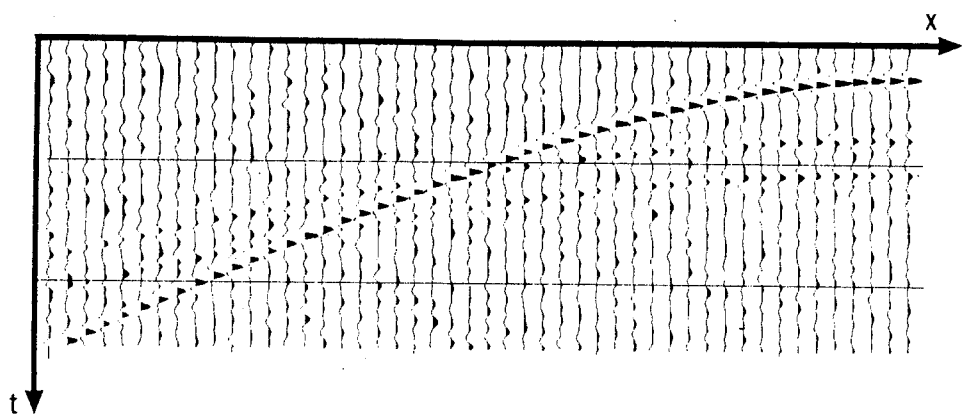

FIG. 5A, 5B illustrate the technique of combination by phasing and averaging in the case where N is equal to 2. The extraction of the reflections situated above the well is shown in FIG. 5A. that of the reflections situated below in FIG. 5B. On each of the sections there can be seen an appreciable residue of the phase shifted waves.

Figure 6A:
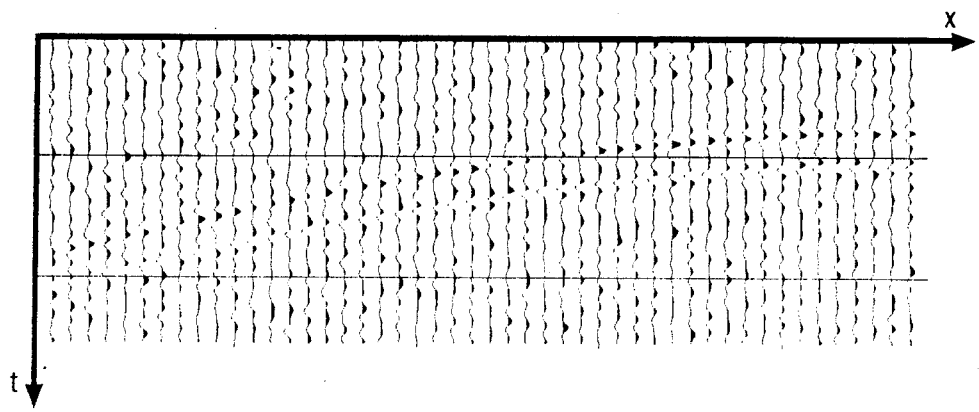
FIGS. 6A and 6B show the effect of combining the different logging sections obtained, after phasing, using a subtraction or anti-averaging technique, which also makes it possible to discriminate discontinuities on one side of the well and on the opposite side.
Figure 6B:
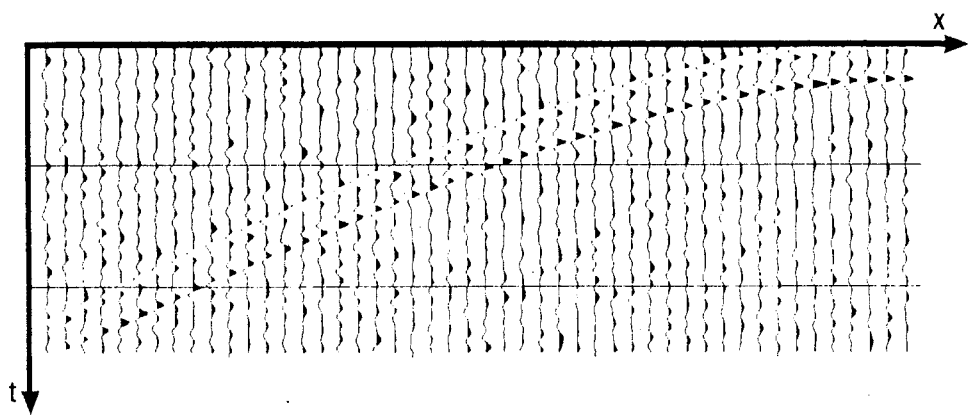

FIGS. 6A and 6B show the effects of the second combination technique by phasing and anti-averaging in the case also where N=2. The extraction of the reflections situated above the well is shown in FIG. 6A, that of the reflections situated below is shown in FIG. 6B. It can be seen that each reflection is represented by a doublet of reflections of opposite amplitudes and signs.

After separation of the reflections, at least two sets of iso-offset sections are available. The first set contains the reflections associated with the markers situated above the wall, the second those associated with the markers situated below.

It is then possible, if required, to apply other known processing techniques to the sets of iso-offset sections obtained by the method of the invention static corrections, obliqueness corrections, common mid-point gathering, if each set contains several iso-offset sections, or migration operation, as is well known to specialists.

The above description refers to an implementation of the method of the invention using a well-logging tool having shoes whose displacement makes it possible to vary its eccentricity in the well section.

Different well-logging tools may also be used for implementing the method.

A well-logging tool may for example, be used without its own centering means. The tool is lowered into the well associated with conventional centering devices, such as the centering tool 12 (FIG. 1) and at least a first series of transmission-reception and logging cycles is carried out by displacing the tool along the well portion to be explored. Then the well-logging is raised for removal of the centering tools 12, and the preceding operations are repeated, the well-logging tool resting on the lowest wall of the well and so offset with respect to the preceding case, so as to obtain a second series of cycles. The combination of the loggings by averaging and anti-averaging is here carried out from the two iso-offset sections obtained respectively with the centered tool and with its off centering.

Without departing from the scope of the invention a well-logging tool may be used in which the off-centering of the transmission and/or reception transducers is obtained by displacing them with respect to the body of the tool or else by disposing in the body several transducers laterally offset with respect to each other so as to vary their distances to the markers which it is a question of discriminating. Different combinations may be adopted, and for example the combination of a transmission transducer with two offset reception transducers may be used. The shift in time of the reflected signals between the two iso-offset sections obtained is here equal to the static shift.

Still without departing from the scope of the invention, a well-logging tool may be used in which the transducers are connected to the body of the tool by universal joints (gimbals) so that their orientation does not change if the tool rotates on itself during its movement along the well.

What is claimed is:

1. A method of acquiring and processing signals obtained in wells or drill-holes passing through a subterranean zone, to discriminate between geological discontinuities, particularly discontinuities oriented substantially in the same direction as the well and situated on each side thereof, the method comprising:
   (a) displacing a well-logging tool longitudinally along the well, the well-logging tool including signal transmission means and signal reception means;
   (b) actuating the transmission means to cause a transmission-reception cycle including transmission by said transmission means of signals into the formations of the sub-soil surrounding the well and reception by said reception means of the signals reflected by the discontinuities of the subsoil;
   (c) recording or logging the signals received by said reception means at different longitudinal positions of the well-logging tool so as to form cross sections representative of the formations around the well;
   (d) altering the transverse position of at least one of the transmission means and the reception means with respect to the axis of the well, and repeating steps (b) and (c) to cause recording or logging of signals from at least two series of said transmission-reception cycles along a portion at least of the well, said transmission-reception cycles being done at different transverse positions of the transmission means and/or reception means with respect to the axis of the well, so that the distances between said at least one of the transmission and the reception means and the discontinuities situated on each side of the well are different for each series of cycles; and
   (e) combining together the log sections obtained following said series of cycles along said well portion, so as to form cross-sections in which said discontinuities on each side of the well are separated from each other.

2. The method as claimed in claim, wherein step (d) is performed at a longitudinal position along the well occupied by the well-logging tool and then steps (a) through (d) are repeated, so that at least two successive transmissionreception cycles are carried out at said longitudinal position before displacing of the well-logging tool to the next longitudinal position, with the transverse position of said at least one of the transmission means and the reception means relative to the axis of the well being different for each such cycle.

3. The method as claimed in claim 1, wherein steps (b) and (c) are performed at separate longitudinal positions over the length of the well to provide a series of transmission-reception cycles and then step (d) is performed, so that said at least one of the transmission means and the reception means is transversely displaced with respect to the axis of the well between two such successive series.

4. The method as claimed in claim 1, wherein step (d) includes moving the well-logging tool transversely relative to the well.

5. The method as claimed in claim 1, wherein said at least one of the transmission means and the reception means comprise at least two distinct units laterally offset with respect to each other, relative to the axis of the well, and wherein step (d) includes employing each of the units at the same longitudinal position of the well-logging tool to vary said transverse positions.

6. The method as claimed in claim 1, wherein step (d) includes laterally displacing said at least one of the transmission means and the reception means relative to the well-logging tool.

7. The method as claimed in claim 1, wherein step (e) comprises phasing of the logged signal associated with discontinuities on each side of the well, taking into account the different shifts between the successive transverse positions of said at least one of the transmission means and the reception means.

8. The method as claimed in claim 7, wherein step (e) further comprises summing different cross-sections after shifting.

9. The method as claimed in claim 7, wherein step (e) further comprises, after shifting, subtracting each of the cross-sections from a reference cross-section to show the discontinuities on a single side of the well.

10. The method as claimed in claim 1, wherein said well-logging tool is displaced in a substantially horizontal well portion.

11. The method as claimed in claim 1, wherein the well-logging tool is an acoustic well-logging tool and step (b) comprises actuating the acoustic well-logging tool to transmit acoustic signals.

12. The method as claimed in claim 1, wherein the well-logging tool is an electromagnetic well-logging tool and step (b) comprises actuating the electromagnetic well-logging tool to transmit electromagnetic signals.

13. A device for acquiring and processing the logs of signals collected in a well, comprising in combination;
   a well-logging tool having signal transmission means, signal reception means, and means for modifying the transverse position of at least one of said transmission means and said reception means with respect to the axis of the well;
   a control and logging assembly and
   means for transferring signals collected by the reception means to said control and logging assembly, said control and logging assembly including means for combining the signals obtained from at least two series of transmission-reception cycles for which the respective transverse positions of said at least one of the transmission means and the reception means are different.

14. The device as claimed in claim 13, wherein said modifying means comprises means for varying the position of said well-logging tool with respect to the axis of the well.

15. The device as claimed in claim 13, wherein said at least one of the signal transmission means and signal reception means comprises a plurality of individual transmission means and/or reception means disposed at different transverse positions inside the well-logging tool and said modifying means comprises means for selectively activating individual ones of said plurality.

16. The device as claimed in claim 13, wherein said well-logging tool further comprises means for moving said at least one of the transmission means and the reception means inside the body of the tool.

* * * * *